Dec. 5, 1967  M. F. KEATHLEY ET AL  3,356,044
FOLD-OVER PIE FORMING UNIT
Filed March 30, 1966
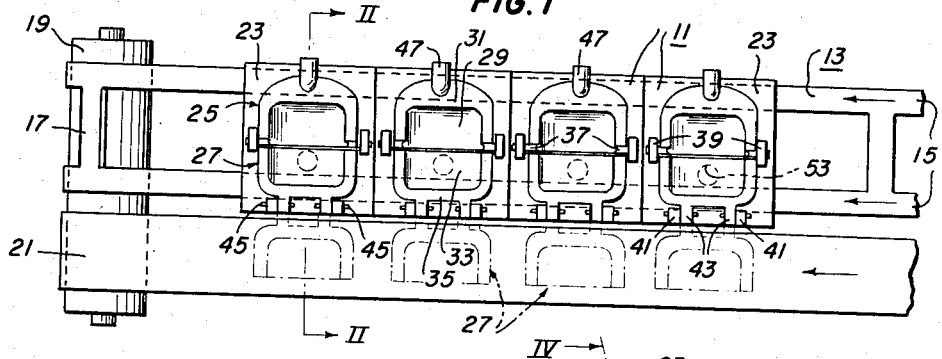
FIG. 1
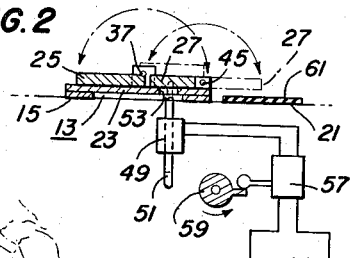
FIG. 2
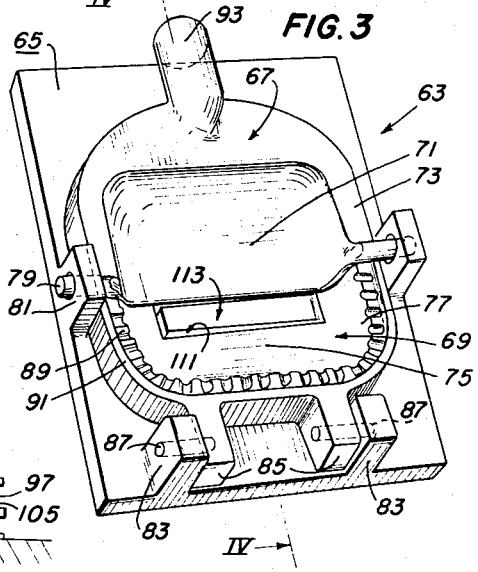
FIG. 3
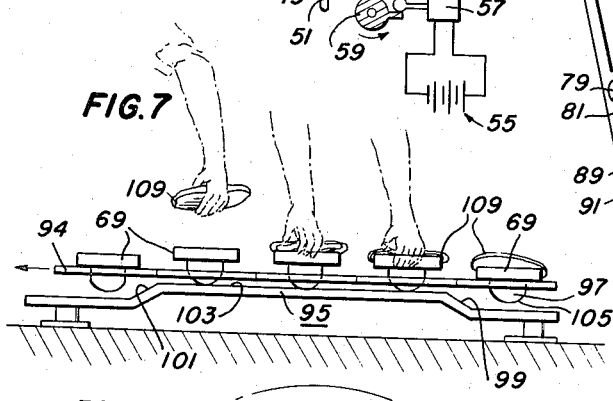
FIG. 7
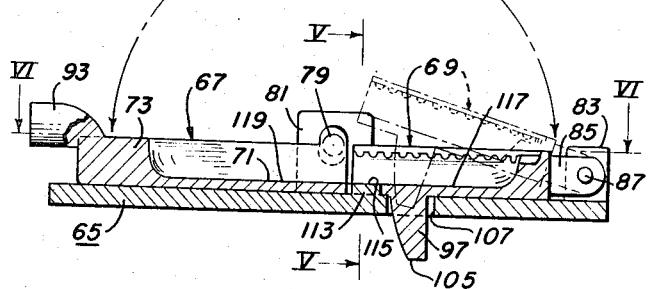
FIG. 4
FIG. 5
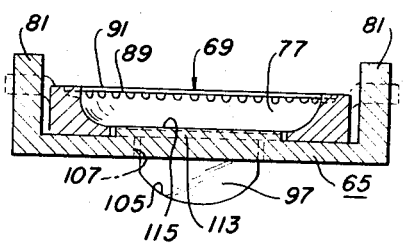
FIG. 6
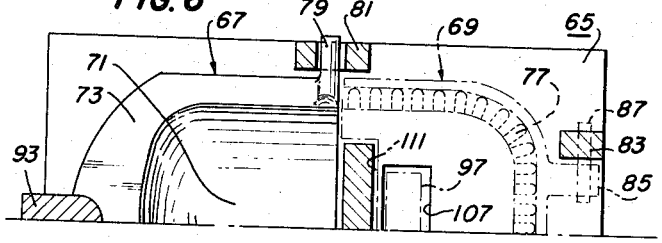
INVENTOR.
MAURICE F. KEATHLEY
ARTEZ F. MAINERS
BY John R. Walker, III
Attorney

United States Patent Office 3,356,044
Patented Dec. 5, 1967

3,356,044
FOLD-OVER PIE FORMING UNIT
Maurice F. Keathley, 1150 Audubon Drive 38117, and Artez F. Mainers, 1135 Cooper, Apt. 1 38104, both of Memphis, Tenn.
Filed Mar. 30, 1966, Ser. No. 538,814
8 Claims. (Cl. 107—1)

ABSTRACT OF THE DISCLOSURE

Fold-over pie forming units in a pie making apparatus. Each of said units includes a horizontal base carried on a conveyor, a generally flat primary mold half arranged on one side of said base, a generally flat secondary mold half arranged on the opposite side of said base, and means pivotally supporting said primary mold half for substantially 180° pivotal movement of said primary mold half over said secondary mold half to fold a dough sheet over filler material and form substantially a completed pie resting in said secondary mold half.

---

This invention relates to pie forming apparatus generally and more particularly relates to a pie forming unit for use in making fold-over pies or for making the well-known fried pies, of any shape, such as semi-circular, rectangular or the like. The present invention represents an improvement in the pie making apparatus disclosed in Patent No. 3,046,911 issued July 31, 1962. In the structure of the pie making apparatus of said patent, a row of individual pie mold units are tandemly carried on a conveyor and moved under a cylindrical press roller. In the operation of the apparatus of said patent, a thin horizontal sheet of dough is synchronously fed along on top of the row of pie molds; individual gobs of fruit filler are placed on top of the dough sheet and over each pie mold; the sheet of dough is longitudinally double-folded over the fruit filling; the row of partially formed pies are then moved under the press roller and the roller cuts and seals the edges of the dough sheet around the fruit filled center and the individual pies are formed.

In the operation of the above-mentioned patent, much of the work was done by hand and several workmen were necessary to attend the apparatus. One particular duty of the workmen included manually longitudinally folding the sheet of pie dough as the pies were being formed. Another duty included manually removing the pies from the individual pie molds after the pies had been formed in the molds. For efficiency, the pie making operation should be carried out rapidly. In the operation of previous pie making apparatus, the steps or stages in the pie making operation which were carried out manually resulted in a bottleneck which reduced the efficiency of the operation. Also, considerable skill and practice were necessary for a workman to become proficient in such manually performed duties. Removing the formed pies from the individual pie molds especially was difficult and slowed the overall pie making process. The formed pies frequently had a tendency to stick in the pie mold and were difficult to remove rapidly from the moving train of pie molds.

A principal object of the present invention is to provide automatically operable pie forming means and such means whereby the pie dough sheet is automatically folded and the finished pies automatically ejected or removed from the pie mold.

Another object is to provide a pie making unit having pivotable co-acting primary and secondary mold halves for respectively forming a pie and ejecting the formed pie from the unit.

A further object is to provide a pie making means requiring a comparatively few workmen for attending the operation of the apparatus.

A further object is to provide a pie making unit and pie making means for rapidly forming pies, and for forming pies of uniform size and quality.

A further object is to provide versatile pie making means or a versatile pie making unit suitable for either fully automatic or semi-automatic removal of the pies from each unit.

The means by which the foregoing and other objects of the present invention are accomplished and the manner of their accomplishment will be readily understood from the specification upon reference to the accompanying drawings, in which:

FIG. 1 is a somewhat schematic view of a preferred embodiment of the present invention having fully automatic means for removing the formed pies from the plurality of pie forming units.

FIG. 2 is a vertical plane sectional view taken as on the line II—II of FIG. 1 and schematically illustrating the pie removal actuating means of the pie forming apparatus.

FIG. 3 is a perspective view of a pie forming unit of a second embodiment of the present invention having semi-automatic means for removing the formed pies from each unit of the plurality of pie forming units.

FIG. 4 is a vertical plane longitudinal sectional view taken as on the line IV—IV of FIG. 3.

FIG. 5 is a vertical plane transverse sectional view taken as on the line V—V of FIG. 4.

FIG. 6 is a horizontal plane sectional view taken as on the line VI—VI of FIG. 4 and illustrating the secondary mold half in broken lines for the purpose of clarity.

FIG. 7 schematically illustrates the semi-automatic operation of the second embodiment of the invention.

Referring to the drawings, and to the first embodiment of the invention illustrated in FIG. 1 and FIG. 2, a plurality of pie forming units, each indicated by numeral 11, are illustrated in tandem arrangement and fixedly secured on a conveyor indicated 13. The conveyor, schematically and fragmentarily illustrated in FIG. 1, includes a pair of flexible or articulated longitudinal members 15 and intermittently spaced cross members 17. Conveyor 13 is trained around and supported by cylindrical rollers 19 (one shown). Suitable drive means (not shown) convey the conveyor in an endless path. For the purpose of clarity, the conveyor is illustrated in FIG. 1 as moving from right to left as indicated by the arrows in that figure. It will be understood that although only four pie forming units 11 are shown, the pie forming units are tandemly arranged in a substantially continuous row about conveyor 13. A second conveyor 21 parallels and is mounted alongside of conveyor 13. Although various drive means may be employed for driving conveyor 21, a simple drive means is illustrated and such drive means is substantially synchronized with the movement of conveyor 13. Conveyor 21, as illustrated, is preferably in the form of an endless flat belt and is supportingly conveyed by rollers 19.

Each pie forming unit 11 includes a plate-like horizontally extending base 23 and co-acting primary and secondary mold halves 25, 27. The primary and secondary mold halves are each somewhat alike and are each somewhat scoop or shovel shaped. Primary mold half 25 includes a concave-surfaced bottom portion 29 and a U-shaped rim portion 31 integrally formed with and bordering bottom portion 29. Secondary mold half 27 includes a concave-surfaced bottom portion 33 and an integrally formed rim portion 35 bordering bottom portion 33.

Pivot means pivotally support primary and secondary mold halves 25, 27 from base 23. A pair of oppositely projecting pin portions 37 of primary mold half 25 pivotally extend through and co-act with a pair of spaced apertured post portions 39 of base 23. Hinge-half projections 41, 43 and pins 45 pivotally support secondary mold half 27 from base structure 23. Hinge-half projections 41, 43 are preferably integrally formed respectively with base 23 and secondary mold half 27. Primary and secondary mold halves 25, 27 are normally arranged in substantially co-planar configuration with the leg portions of the U-shaped rim portions 31, 35 of the respective mold halves being abuttingly and longitudinally correspondingly arranged. The primary and secondary mold halves when arranged in an open and normally flat configuration are freely pivotable and rest on the upper surface of base 23. The pivot axes of primary and secondary mold halves 25, 27 extend respectively parallel and fore and aft relative to the direction of travel of the pie making unit. The substantially thin, concave-surfaced bottom portions 29, 33 of primary and secondary mold half 25, 27 pivotally rest on the upper surface of base 23. Primary mold half 25 is pivotally supported from base 23 for substantially 180° movement of the primary mold half over the secondary mold half. The pivot axis of primary mold half 25 is disposed substantially intermediately of base 23. By way of description, primary and secondary mold halves 25, 27 will be considered generally in normal or open disposition and as having inwardly and outwardly disposed structure, and with the respective inwardly disposed structure of mold halves 25, 27 being contiguously arranged and with the outwardly disposed structure as being spaced apart and outwardly arranged. Stated another way, the inwardly disposed structures of mold halves 25, 27 are respectively adjacent the open and leg portions of the U-shaped rim portions 31, 35 (that is, the open end of the U where the legs of the U are spaced apart), and the outwardly disposed structures of mold halves 25, 27 are respectively adjacent the closed end portions of the U-shaped rim portions 31, 35 (that is, the closed end of the U where the legs of the U are joined by the intermediate portion). The pivot axis of secondary mold half 27 is substantially contiguous the outwardly disposed structure of that mold half; the pivot axis of primary mold half 25 is contiguous the inwardly disposed structure of that mold half. Secondary mold half 25 is normally disposed in a lowered horizontal disposition but is adapted to be pivotally overturned substantially 180° in a direction away from primary mold half 25. The respective 180° pivotal movements of primary and secondary mold halves 25, 27 may best be seen in FIG. 2.

In the operation of the pie-forming means, a thin sheet or horizontally extending web of pie dough from a dough sheeting mechanism (not shown) is synchronously fed onto and overlies continuously the moving series of pie forming units 11. As the dough sheet covered units 11 are moved by conveyor 13, a pie filler mechanism (not shown) synchronized with the movement of conveyor 13, intermittently deposits individual gobs of pie filler material on each dough sheet covered unit 11. The sheet of dough is slit on opposite sides of primary mold half 25 for substantially half the width of the dough sheet by suitable means (not shown) well-known to those skilled in the art. Primary mold half 25 of each unit 11 is then pivotally moved 180° to a position overlying secondary mold half 27. The pivotal movement of primary mold half 25 double-folds the pie sheeting around the fruit-filled center and cuts and crimp-seals the edge portions of the pie. The primary mold half is then returned to an open position and the finished pie is left supported in secondary mold half 27. The secondary mold half is then pivotally moved substantially 180° and the pie pivotally overturned and deposited on the upper conveying surface of conveyor 21. (FIGS. 1 and 2 show the secondary mold half of each pie forming unit 11 in broken lines in a pie ejecting disposition.)

Primary and secondary mold halves 25, 27 may be operated manually by successively manually actuating the mold halves as they are moved along on conveyor 13. However, mold halves 25, 27 preferably are automatically actuated. The outwardly projecting handle or stud portion 47 of each mold half 25 preferably engages and is actuated by suitable cam mechanism (not shown). Such cam mechanism may be in the form of clockwise and counter-clockwise tandemly spaced semi-cylindrical spirals or tracks. Such cam mechanisms, well-known in the art, engage stud portion 47 of the primary mold half of each unit 11 and pivotally close and open successively the primary mold half of each unit as the series of units are being conveyed by conveyor 13.

The means for actuating secondary mold half 27 may best be seen in FIG. 2. Preferably, solenoid-operated plunger means flip the secondary mold half of each unit in succession as the units are being conveyed. A solenoid 49 having a plunger 51 is fixedly mounted subjacently of conveyor 13. Base 23 of each pie-forming unit 11 is provided with an aperture 53 disposed directly underneath the inward structure of each secondary mold half 27. Electricity from a suitable electrical energy source 55 acting through switch means 57 actuate solenoid 49 to cause plunger 51 to plunge upwardly. A revolving cam 59 synchronously driven with conveyor 21 intermittently actuates switch means 57 for intermittently actuating plunger 51 of solenoid 49. Solenoid plunger 51 is actuated precisely at a time when aperture 53 of base 23 of each pie forming unit 11 is in vertical register with plunger 51. After a pie has been formed with the pivotal movement of primary mold half 25, and after the primary mold half has pivotally returned to a flat and normal disposition, the actuation of plunger 51 through base aperture 53 pivotally overturns second mold half 25 to an elevated position over conveyor belt 21 (see the broken line position indications in FIGS. 1 and 2). The solenoid plunger actuating means is adapted to pivotally overturn a finished pie supported in the secondary mold half of each unit and to gravitatingly transfer each pie of each unit to the upwardly facing conveying surface 61 of second conveyor 21. A fully automatic pie removal means may thus be provided for removing the pies from the successively moving plurality of pie forming units 11.

The semi-automatic pie removal means is illustrated in FIGS. 3–7 and differs from the above-described embodiment principally in the structure and operation of the secondary mold half of each pie forming unit. The structure and operation of each primary mold half of each unit in this embodiment is substantially the same as the structure and operation of the primary mold half of the above-described embodiment. Basically, the function of the pie removal means of this second embodiment includes means for only slightly lifting the secondary mold half of each unit so that a pie supported therein may readily be removed by hand.

Each pie forming unit, indicated by numeral 63, includes a base 65, a primary mold half 67 having bottom and rim portions 71, 73, and a secondary mold half 69 having bottom and rim portions 75, 77. The pivot means pivotally supporting primary mold half 67 from base 65 include spaced apart pin portions 79 and apertured post portions 81 integrally formed respectively with primary mold half 67 and base 65. The pivot means pivotally supporting secondary mold half 69 include co-acting hinge half projections 83, 85 respectively formed with base 65 and secondary mold half 69, and a pair of hinge pins 87.

The U-shaped rim portion 77 of the secondary mold half of each unit 63 preferably includes an upwardly facing crenulated crimping surface 89 and an upwardly facing cutoff surface 91 juxtaposedly arranged with surface 89. The crimping and cutoff surfaces 89, 91 are adapted to co-act with the flat U-shaped surface of primary mold half rim portion 73; as a pie is being formed by primary mold half 67, the crimping and cutoff surfaces 89, 91 of secondary mold half 69 crimp seal and cut the dough sheet and shape the edge profile of the pie. Primary mold half 67 includes a stud portion 93 for actuating the primary mold half. Preferably, the primary mold half is actuated by engaging stud portion 93 with semi-cylindrical spiral-shaped track or cam mechanism as mentioned in the first-described embodiment.

The pie forming means of the second embodiment includes lifting means for pivotally lifting the secondary mold half of each pie forming unit 63 as the units are moved by a conveyor 94 (see FIG. 7). A raceway 95 and a boss projection 97 pendantly fixed to the underside of the secondary mold half of each pie forming unit comprise the principal structure of the lifting means of the second embodiment. Raceway 95 is disposed subjacently of conveyor 94 and extends substantially parallel the direction of movement of the conveyor. Raceway 95 is rail-like and includes an upwardly extending oblique leading surface 99, downwardly extending trailing surface 101, and an elevated horizontal surface 103 extending between surfaces 99, 101. Boss structure 97 of the secondary mold half of each pie-forming unit 63 preferably is integrally formed with the secondary mold half. Each boss 97 is substantially rectangular in horizontal cross-section and is defined along the bottom thereof by a semi-circular surface 105.

Base 65 is provided with a rectangular aperture 107 for accommodating boss structure 97. When secondary mold half 69 is lying flat in a normal inactive disposition, boss structure 97 pendantly projects through aperture 107. (FIG. 7 schematically illustrates the sequential positions of a single pie forming unit 63 as the unit is moved by conveyor 93 over raceway 95.) As each pie forming unit is conveyed by conveyor 94, semi-cylindrical surface 105 of the secondary mold half boss structure 97 engages successively oblique leading surface 99, horizontal elevated surface 103, and oblique trailing surface 101 of raceway 95. Such actions cause secondary mold half 69 sequentially to be raised, to be held in a raised disposition momentarily, and to be lowered to rest again on base 65. When boss structure lower surface 105 slidably engages horizontal elevated surface 103 of raceway 95, the secondary mold half is in a lifted disposition and the operator attending the pie forming apparatus may readily grasp and remove a pie 109 from the secondary mold half.

A gap 111 is preferably provided in the inwardly disposed structure of bottom portion 75 of secondary mold half 69. Bung structure 113 integrally formed of and projecting upwardly from base structure 65 is also preferably provided for co-action with gap 111. The relative arrangement and proportions of bung structure 113 and gap 111 is such that the bung structure substantially fills the gap opening with upper surface 115 of bung structure 113 being substantially level with the upwardly facing concave surface 117 of the secondary mold half bottom portion 75. Also, the upper concave surface 119 of primary mold half bottom portion 71 is disposed substantially level with bung structure upper surface 115. Gap opening 111 in secondary mold half 69 provides finger-receiving recess means for the operator in removing a pie from the secondary mold half; when the secondary mold half is in a lifted disposition, as shown in broken lines in FIG. 4, the operator may readily remove a pie from the secondary mold half of pie forming unit 63. Bung structure 113 serves to fill the opening of gap 111 as primary mold half 67 is disposed over and is press-forming a pie in secondary mold half 69; bung structure 113 facilitates a smoothly contoured pie surface. Although bung structure 113 is preferably incorporated in each pie forming unit 63, the bung structure may be dispensed with in a unit having a secondary mold half having a very thin bottom portion 75. In a pie forming unit employing a secondary mold half having a very thin bottom portion 75, the flat upper surface of the base of the pie forming unit would suffice for supporting the pie dough in the finger recess gap as a pie is being formed; a pie surface will not be unduly pressed out of shape in the finger recess gap of the secondary mold half.

Although the present invention has been described in some detail by way of exemplification, it is to be understood that it is not to be so limited since changes and modifications may be made therein which are within the full intended scope of this invention as hereinafter claimed.

We claim:

1. In pie making apparatus, pie forming means comprising a plurality of pie forming units; conveyor means including means for conveying said plurality of pie forming units in tandem arrangement; each unit of said plurality of units including a horizontal base, a generally flat primary mold half arranged on one side of said base, a generally flat secondary mold half disposed horizontally contiguous said primary mold half and arranged on the opposite side of said base, said primary and secondary mold halves being substantially co-planar arranged in a normal open disposition and in such disposition being adapted to receive a horizontal sheet of pie dough and a gob of pie filling material, means pivotally supporting said primary mold half for substantially 180° pivotal movement of said primary hold half over said secondary mold half, said primary mold half being adapted to be pivotally moved over said secondary mold half thereby folding said dough sheet over said filler material and forming substantially a completed pie resting in said secondary mold half, means pivotally supporting said secondary mold half for substantially 180° pivotal movement of said secondary mold half in a general direction away from said primary mold half, said secondary mold half being adapted to be pivotally moved substantially 180° for overturning a pie resting in said secondary mold half and for gravitatingly ejecting the pie from said secondary mold half and away from the pie forming unit.

2. A pie forming means as defined in claim 1 which includes second conveyor means including means having an upwardly facing conveying surface disposed alongside of the first-mentioned conveyor means and movable in a direction corresponding to the direction of movement of the first-mentioned conveyor means, said second conveyor means being adapted to catch and receive each pie ejected from each unit of said plurality of pie forming units.

3. A pie forming means as defined in claim 2 which includes automatically operable actuating means synchronized with the movement of said plurality of pie forming means for pivotally actuating said secondary mold half of each pie forming unit, said actuating means being adapted to pivotally overturn the secondary mold half of each pie forming unit and to over turn and gravitatingly transfer a pie from each pie forming unit to said upwardly facing conveying surface of said second conveyor means.

4. In pie making apparatus, pie forming means comprising a conveyor movable in a certain direction, a plurality of pie forming units mounted on said conveyor and arranged in a row extending parallel the direction of movement of said conveyor, each unit of said plurality of said pie making units including horizontally extending base structure, a primary mold half having a concave-surfaced upwardly facing bottom portion and a U-shaped rim portion bordering said bottom portion, a secondary mold half having a concave-surfaced upwardly facing bottom portion and a U-shaped rim portion bordering said bottom portion, said primary and secondary mold halves being normally arranged in flat substantially co-planar configuration with the leg portions of the U-shaped rim portions of one mold half being longitudinally correspondingly arranged with the leg portions of the U-shaped rim portions of the other mold half, each mold half of said primary and secondary mold halves including outwardly and inwardly disposed structure adjacent respectively the closed end portion and the open end leg portions of the U-shaped rim portion of each mold half, primary and secondary pivot means pivotally supporting respectively said primary and secondary mold halves from said base structure and with the pivot axes respectively of said primary and secondary pivot means being in parallel spaced relationship and extending respectively fore and aft relative to the direction of travel of said pie making unit, the pivot axis of said primary mold half being contiguous said inward structure of that mold half, the pivot axis of said secondary mold half being contiguous said outward structure of that mold half, said primary mold half being adapted to be pivotally moved substantially 180° to and from a closed disposition in which said primary mold half overlies and is matingly engaged with said secondary mold half, or to and from an open disposition in which said primary and secondary mold halves are substantially normally co-planar arranged; said secondary mold half being normally disposed in a lowered horizontal disposition but adapted to be pivotally moved upwardly and in a direction away from said primary mold half substantially only when said primary mold half is in said open disposition.

5. A pie forming means as defined in claim 4 in which each unit of said plurality of pie forming units includes structure defining a gap in said secondary mold half bottom portion opening upwardly, and intersecting the concave surface of said bottom portion.

6. A pie forming means as defined in claim 5 in which each unit of said plurality of pie forming units includes upwardly projecting bung structure mounted from said base structure and with the proportions and arrangement of said bung structure being such as to substantially fill the opening of said gap in said secondary mold half when said secondary mold half is in a normally lowered and horizontal disposition.

7. A pie-forming means as defined in claim 6 which includes lifting means for pivotally lifting said secondary mold half about the axis of said secondary pivot means of each unit of said plurality of said pie forming units as said plurality of units are being conveyed by said conveyor.

8. A pie forming means as defined in claim 7 in which said lifting means includes a fixed raceway disposed subjacently of and extending substantially parallel to the direction of movement of said conveyor, and additionally includes boss structure pendantly fixed to the underside of said secondary mold half of each pie forming unit; said raceway being adapted to directly engage said boss structure of each pie forming unit and to pivotally lift said secondary mold half of each unit in response to movement of each unit by said conveyor.

References Cited

UNITED STATES PATENTS

| | | | |
|---|---|---|---|
| 1,117,929 | 11/1914 | Turnbull et al. | 99—373 X |
| 2,700,939 | 2/1955 | Liston | 107—1 |
| 2,855,867 | 10/1958 | Zeitlin | 107—1 |
| 2,922,356 | 1/1960 | Oliver | 99—373 |

WILLIAM I. PRICE, *Primary Examiner.*